United States Patent [19]

Wolf

[11] 4,160,940
[45] Jul. 10, 1979

[54] METHOD OF AND SYSTEM FOR OPERATING AN INDUCTION MOTOR

[75] Inventor: Horst Wolf, Albershausen, Fed. Rep. of Germany

[73] Assignee: Zinser Textilmaschinen GmbH, Ebersbach, Fed. Rep. of Germany

[21] Appl. No.: 838,942

[22] Filed: Oct. 3, 1977

[30] Foreign Application Priority Data

Oct. 4, 1976 [DE] Fed. Rep. of Germany ....... 2644748

[51] Int. Cl.² .............................................. H02P 5/34
[52] U.S. Cl. .................................... 318/803; 318/805; 318/808
[58] Field of Search ............... 318/230, 227, 232, 237, 318/215, 216, 231, 798–803, 805, 808

[56] References Cited

U.S. PATENT DOCUMENTS

| | | | |
|---|---|---|---|
| 4,001,660 | 1/1977 | Lipo ..................................... | 318/231 |
| 4,019,105 | 4/1977 | Cornell et al. ........................ | 318/231 |

*Primary Examiner*—Gene Z. Rubinson
*Attorney, Agent, or Firm*—Karl F. Ross

[57] ABSTRACT

An induction motor of the squirrel-cage type is driven from a polyphase power line through the intermediary of two cascaded thyristor arrays converting the line current into an adjustable rectified current and reconverting the latter into a stator current of variable frequency. The magnitude of the rectified current is varied via the first thyristor array, under the control of a tachometric signal from a speed sensor coupled with the rotor of the machine, to maintain the rotor speed at a selected level within a predetermined dynamic range in which the stator current varies approximately in proportion to the slip frequency under changing load. The slip frequency is adjusted by the second thyristor array under the control of an arithmetic unit which receives the tachometric signal along with a voltage feedback from the stator input and which maintains the stator voltage substantially proportional to rotor speed in order to stabilize the excitation current of the motor. The maximum value of the tachometric signal fed to the arithmetic unit is limited by a clamping circuit to allow the selection of rotor speeds above the dynamic range without further increases in power.

13 Claims, 4 Drawing Figures

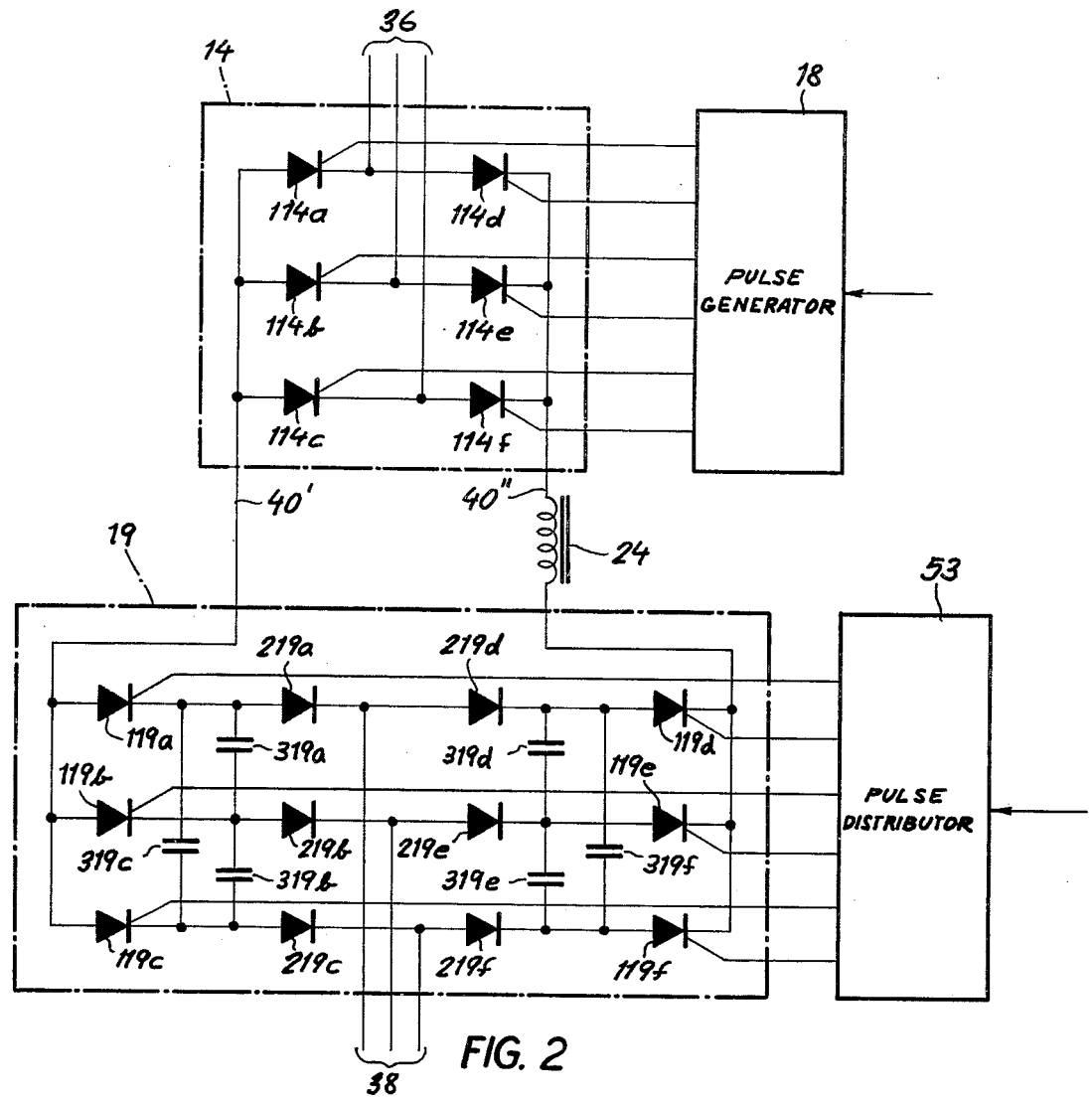
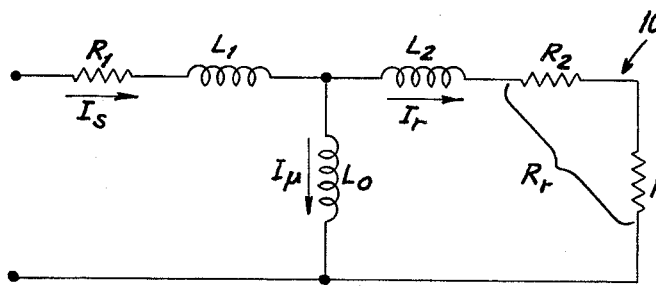
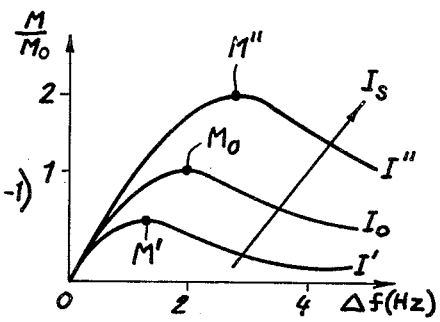
FIG. 2
FIG. 3
FIG. 4

METHOD OF AND SYSTEM FOR OPERATING AN INDUCTION MOTOR

FIELD OF THE INVENTION

My present invention relates to a method of controlling the operation of an induction motor and to a system for carrying out the method.

BACKGROUND OF THE INVENTION

With the advent of controlled rectifiers (such as SCR's or thyristors) and variable-frequency d-c/a-c converters, the use of induction motors as a relatively maintenance-free alternative to the d-c shunt motor is gaining increased attention. Thus, in a paper entitled "CURRENT-SOURCE CONVERTER FOR AC MOTOR DEVICES" by Kenneth P. Phillips (IEEE Transactions in Industry Applications, Vol. IX-8, No. 6, November/December 1972, pages 679–683) there has been described a converter circuit which utilizes current and frequency adjustments in order to stabilize the speed of a squirrel-cage motor at a selected level in the face of variable load conditions. A first array of thyristors, responsive to feedback to a speed-error signal from a motor-driven tachometer, converts the line current into a direct current of load-dependent magnitude which is then reconverted by a second thyristor array into a three-phase operating current of a load-dependent frequency determined by a similar feedback signal.

In such a system, sudden variations in loading conditions (such as may occur, for instance, in the event of a break in the transmission between the rotor and the load) are liable to cause abrupt changes in the input voltage of the motor which may have serious consequences for the motor itself and/or for the associated control circuits. These changes result from the somewhat sluggish response of the first thyristor array to the altered torque requirements in re-establishing the proper relationship between slip frequency and current supply. Since the stator current is the vector sum of the load-dependent rotor current and the excitation current required for the generation of the magnetic flux, changes in the former affect the latter and also the input voltage appearing at the phase windings of the stator.

OBJECTS OF THE INVENTION

The general object of my present invention, therefore, is to provide an improved method of and system for controlling the operation of an induction motor with avoidance of harmful voltage transients and with dependable stabilization against pull-out.

A related object is to provide means in such a system for maintaining a substantially invariable excitation current at a given rotor speed under all operating conditions within a predetermined dynamic speed range in which changes in load can be accommodated by corresponding changes in motor power.

A further object is to provide means in such a system for allowing the selection of speeds beyond that range with no further increases in motor power.

SUMMARY OF THE INVENTION

The output power of any motor is given by $M \cdot n$ where $M$ is its torque and $n$ is its rotor speed. If a change in load requires a change in power, and if the speed is to remain constant, the torque $M$ must be varied accordingly. In a shunt-wound d-c motor, this can be easily accomplished by modifying the rotor current while maintaining a steady excitation current in the stator windings. An induction motor, however, has only one set of terminals common to its stator and its rotor so that the rotor current $I_r$ and the excitation or magnetization current $I_\mu$—whose vector sum is the input or stator current $I_s$—cannot be varied independently.

The rotor current $I_r$ is determined by the magnetic flux $\psi$, which in turn is proportional to the excitation current $I_\mu$ as long as there is no saturation of the ferromagnetic stator and rotor elements such as the cores of the phase windings, and by the slip frequency $\Delta f = f_s - f_r$ where $f_r$ is the rotor frequency in terms of revolutions per unit of time and $f_s$ is the corresponding frequency of the rotating stator field. (For convenience, and easier comparison with the normal utility-mains frequency of 50 or 60 Hz, these frequencies will be given hereinafter in cycles per second, or Hz.) The maximum torque $M_{max}$ at a given speed n, occurring at a slip frequency $\Delta f$ for which the phase angle of the rotor current with reference to the magnetic field is 45°, is proportional to the square of the stator current $I_s$. With increasing stator currents this torque $M_{max}$ occurs at progressively higher slip frequencies; this condition also represents the breakdown or pull-out point of the rotor since any increase in load beyond that point, resulting in a higher slip frequency, will diminish the available torque in the absence of a compensatory increase in the current supply.

In a system designed to operate at or near the point of maximum torque, therefore, any increase (or decrease) in rotor speed should give rise to an increase (or decrease) in the magnitude of the input current $I_s$, brought about by a first feedback circuit responsive to a control signal proportional to rotor speed, and to a corresponding increase (or decrease) in the frequency $f_s$ of that current, brought about by a second feedback circuit responsive to the same control signal, just as described in the aforementioned Phillips article. This means an approximately constant ratio $I_s/\Delta f$ for any selected speed n. The excitation current $I_\mu$ also remains substantially constant as the vector difference of the codirectionally changing stator and rotor currents.

Moreover, as more fully discussed hereinafter, the apparent rotor resistance $R_r$ (i.e., the ohmic component of the dynamic rotor impedance reflected back into the stator circuit) varies substantially inversely with the slip frequency $\Delta f$. This minimizes changes in voltage drop brought on by the speed-controlled variation of the input current. If both the magnitude and the frequency of that current could be modified instantaneously upon the occurrence of any load change, no objectionable voltage peaks would ever occur. In steady-state operation, the input voltage of the motor is substantially proportional to the rotor frequency $f_r = 60n$ (with n measured in revolutions per minute).

In practice, however, the first feedback circuit has a large time constant due in part to a smoothing reactance such as a choke inserted in the rectification network —i.e. in the output of the first thyristor array—in order to provide a continuous current. As a result of this inherent time lag, in the event of an abrupt load change, the magnitude of the stator current $I_s$ supplied to the input of the induction motor remains virtually constant for an interval of, say, 0.1 to 0.2 second even as its frequency $f_s$ changes virtually immediately under the control of the second feedback circuit whose time constant is much smaller. Thus, pursuant to the foregoing analysis, a sudden load reduction—e.g., on account of a ruptured rotor shaft—calls for a decrease in both the magnitude and the frequency of the input current as the rotor tends to accelerate, yet a decrease in slip frequency would raise the rotor resistance $R_r$ and in the absence of an accompanying current reduction would sharply increase the input voltage at the stator terminals. Conversely, a rapid rise in load—e.g., at the beginning of a weight-lifting stroke—would increase the slip frequency before any significant augmentation of the input current so that the system may go over the breakdown point into an unstable state with a loss of power so fast as to be no longer compensable by an increase in the current supply.

To avoid these inconveniences, my invention provides for an automatic variation in the frequency $f_s$ of the input current in a sense counteracting any change in input voltage by temporarily reversing variations in slip frequency, due to variations in load, within the aforementioned time lag and at a rate substantially faster than the compensatory adjustment of the magnitude of stator current $I_s$ in response to a deviation of the rotor speed n from a fixed or preselected level. Thus, if a diminution of load begins to accelerate the rotor, the resulting momentary decrease in slip frequency $\Delta f$ leads to an increase in rotor resistance $R_r$ which under constant-current conditions manifests itself in a rising input voltage. Instead of conventionally reducing the input frequency $f_s$ to lower the torque, my method increases that frequency and with it the slip frequency to an extent canceling the voltage rise. That condition lasts only for a brief time, usually a small fraction of a second, so that the temporary increase in motor power will not cause a significant further acceleration of the rotor until the throttling of the input current by the slow feedback takes effect. If, on the other hand, the load increases and decelerates the rotor with momentary increase in slip frequency, the resulting reduction in input voltage is translated into an instantaneous lowering of $\Delta f$ to keep that voltage constant. For a brief period, therefore, not enough power will be available to maintain the rated or selected rotor speed; this, however, occurs on the stable side of the breakdown point so that the proper speed level will be re-established as soon as the slow feedback brings the input current up to the requisite amplitude.

Thus, the motor can safely be operated at maximum torque without any risk of pull-out. If a load increase tends to push the operating point over the hump, the lowering of the slip frequency immediately restores the stable condition.

A system implementing the method according to my invention, including a source of polyphase input current of adjustable magnitude and frequency such as a three-phase power line with cascaded conversion circuits in the form of thyristor arrays as described above, comprises a tachometer coupled with the rotor for generating a speed-proportional first signal $V_r$ and a rectification network connected across the phase windings of the stator for generating a voltage-proportional second signal $V_s$. A first feedback circuit similar to that of the aforedescribed conventional system, having a relatively large time constant, is connected between the tachometer and the current source for maintaining the rotor speed at a predetermined level in response to signal $V_r$. An arithmetic unit has inputs receiving the two signals $V_s$ and $V_r$ for synthesizing therefrom a control signal $V_o$ which is normally constant but changes upon a departure of the stator voltage from substantial proportionality with rotor speed n. A second feedback circuit inserted between the current source and the arithmetic unit varies the input frequency $f_s$ in the aforedescribed manner, i.e., in a sense counteracting the voltage changes, prior to effective intervention of the first feedback circuit in response to changes in signal $V_r$ alone.

If an increase in load causes the generation of a corrective signal of such polarity as to reduce the input frequency until the stator current builds up to the required magnitude, that reduction must never exceed the initial slip frequency so as to let the system pass through the synchronous state. Such a slip reversal is easily prevented by suitably limiting the signal amplitude in the output of the arithmetic unit. An overshooting of the breakdown point should also be avoided but creates no problem since, as already explained, it occurs only with diminishing load and for a brief period.

Advantageously, according to a more specific feature of my invention, the arithmetic unit is divided into a subtractor stage and an adder stage separated by a high-gain amplifier. Signals $V_s$ and $V_r$, multiplied by respective constants $c_1$ and $c_2$, are fed to the minuend and subtrahend inputs of the subtractor stage to produce a corrective signal $\Delta V = c_1 V_s - c_2 V_r$ which, after amplification, is applied to the adder stage together with the rotor-speed signal $V_r$ multiplied by a constant $c_3$ (which could be equal to $c_2$). The adder stage then emits the control signal $V_o = c_3 V_r + k\Delta V = kc_1 V_s - (kc_2 - c_3)V_r$ where k is the gain of the amplifier. With $\Delta V = 0$, i.e., during steady-state operation, the input frequency $f_s$ is controlled only by the signal $V_r$ to maintain an optimum slip frequency $\Delta f$ for the selected rotor speed.

In principle, the control signal $V_o$ could also be synthesized exclusively in a subtractor stage receiving the input signals $kc_1 V_s$ and $(kc_2 - c_3)V_r$. My preferred two-stage arrangement, however, simplifies the choice of parameters by establishing a zero amplifier output under steady-state conditions. Furthermore, this arrangement allows the insertion of a clamping circuit in series with the subtrahend input of the subtractor stage to put a ceiling on the signal $c_2 V_r$ at the end of the dynamic range, i.e., when no further increase in power is available because of saturation or because the supply line cannot deliver additional current. If, now, the user selects a speed level n above that dynamic range, the adder still establishes an input frequency $f_s$ higher than the rotor frequency $f_r$ but the subtractor sets the slip frequency at less than its optimum value for that speed, namely at a value consistent with an input voltage yielding the required torque at the upper limit of the dynamic range. Beyond this range, therefore, the maximum torque varies inversely with rotor speed.

BRIEF DESCRIPTION OF THE DRAWING

The above and other features of my invention will now be described in detail with reference to the accompanying drawing in which:

FIG. 2 is a more detail circuit diagram of a pair of conversion networks included in the system of FIG. 1;

FIG. 3 is an equivalent-circuit diagram for the induction motor; and

FIG. 4 is a graph illustrating the relationship between torque and slip frequency of that motor.

SPECIFIC DESCRIPTION

Figure 1:
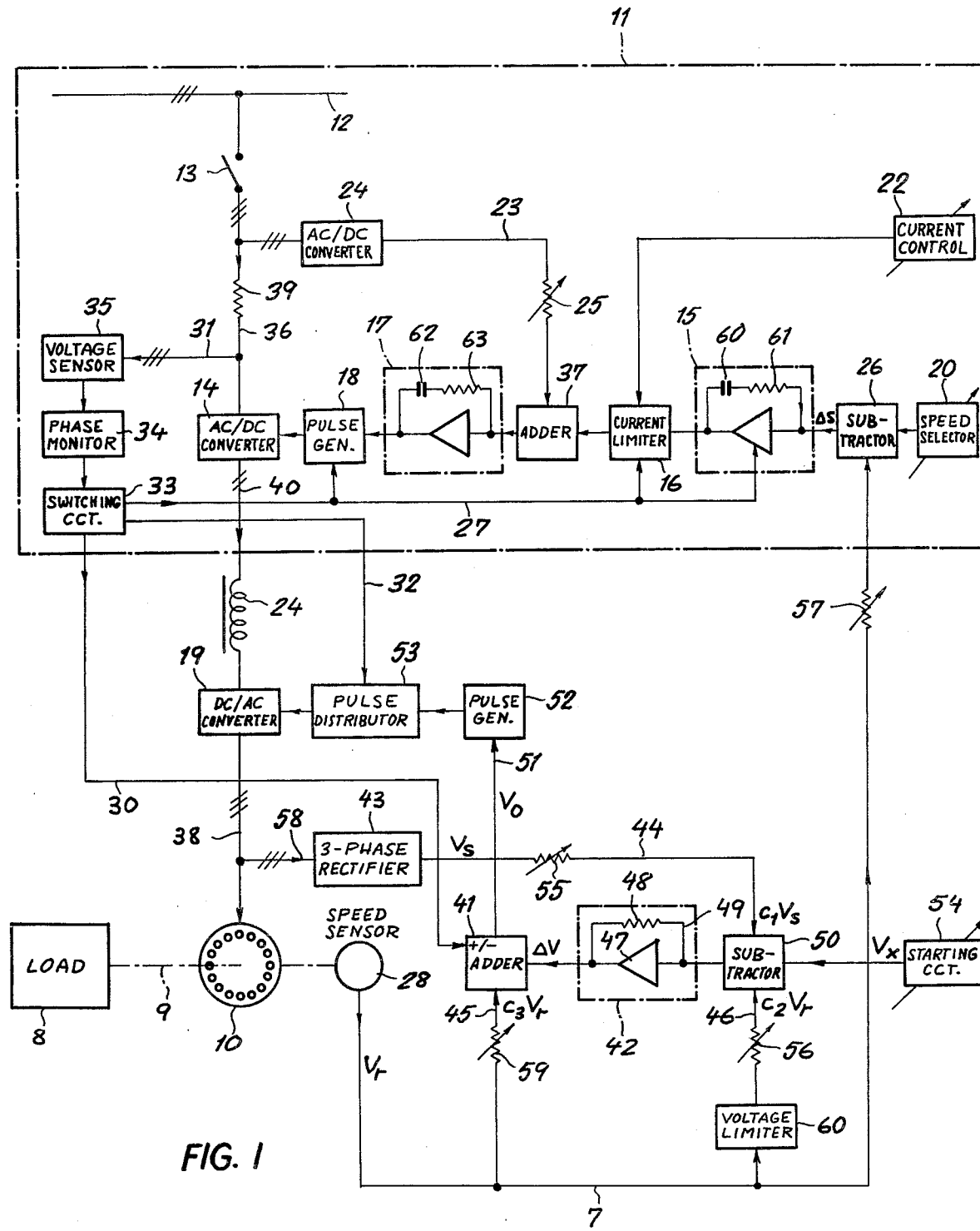
FIG. 1 is a block diagram of a system for operating an induction motor in accordance with my invention.

The system shown in FIG. 1, serving to operate a squirrel-cage motor 10 whose rotor shaft 9 drives a load 8, includes a current-control unit 11 of the type conventionally used to supply an adjustable direct current to a shunt motor. This unit comprises, essentially, an a-c/d-c converter or polyphase rectifier 14 connected across a three-phase power line 12 via a conductor multiple 36 including a master switch 13 and a current-limiting resistor 39 in each of its phase leads (the number of conductors in each multiple connection is conventionally indicated in the drawing by several short slanting cross-strokes). A selector 20 is manually adjustable to set a desired operating speed for the motor 10 ranging, for example, between about 10 and 100 Hz. This speed selector works into a subtractor 26 which compares its output, in the form of a reference voltage, with the output of a tachometer or speed sensor 28 driven by the rotor of motor 10 via shaft 9. The tachometer generates, either directly or through a rectifier, a d-c voltage constituting the aforementioned speed-responsive signal $V_r$ whose magnitude is modified by a variable resistor 57 in series with a lead 7. Line 12 may be energized with 380 volts at a frequency of 50 or 60 Hz; motor 10 may have a power rating of 100 kW or more, for example.

Signal comparator 26 feeds an error signal $\Delta S$ to a speed governor 15 with PI characteristic, represented by an operational amplifier whose feedback path contains a capacitor 60 in series with a resistor 61. The output of this governor passes through a current limiter 16 which is adjustable by a current controller 22 to set the maximum increment for the input current of motor 10, e.g., at 1.5 times its rated current. Limiter 16 works into one input of an algebraic adder 37 whose other input receives a reference signal, representing the instantaneous current amplitude, through a polyphase converter or rectifier 24 and an adjustable resistor 25. Adder 37 augments or diminishes this reference signal by the error signal $\Delta S$, as modified by components 15 and 16, according to the polarity thereof and delivers the result as a control signal to a pulse generator 18 by way of a current governor 17 similar to speed governor 15, comprising an operational amplifier with a capacitor 62 and a resistor 63 serially connected in its feedback path.

Generator 18 emits a train of timing pulses of variable duration determining the magnitude of the rectified current appearing on a two-wire output line 40 of converter 14. A choke 24 in one of these wires (cf. FIG. 2) smoothes the pulsations produced in this converter and lies in the input of a d-c/a-c converter 19 controlled by a pulse generator 52, via a pulse distributor 53, to deliver a three-phase current of variable frequency to a three-conductor multiple 38 terminating at the inputs of the stator windings of motor 10.

A branch 31 of multiple 36 extends to a voltage sensor 35 working into a phase monitor 34 which feeds a switching circuit 33. The latter determines whether all three phases of the current supply are properly energized and in that case activates the feedback network 15–18 through a connection 27. Pulse generator 18 receives via that connection a timing signal synchronizing its operation with the supply frequency. Circuit 33 can also be operatively connected to a nonillustrated load brake in order to disable the feedback network when that brake is actuated; it may, furthermore, monitor the temperature of motor 10 and other components to cut off the current supply in the case of overheating.

The circuitry so far described has also been shown in my German patent application No. 25 32 690 published Feb. 10, 1977 and owned by the assignee of the present application.

Pulse generator 52 is controlled by the aforementioned signal $V_o$ delivered to it over a conductor 51 from an adder 41 forming part of an arithmetic unit which also includes a subtractor 50 and a P-mode excitation governor 42 comprising a high-gain operational amplifier 47 with a resistor 48 in its feedback path 49. Amplifier 47 could also be made to operate in the PI mode, similar to those of governors 15 and 17, by the insertion of a series capacitor in its otherwise ohmic feedback path.

The voltage appearing at the input terminals of motor 10 is also fed via a branch 58 of multiple 38 to a three-phase rectifier 43, similar to converter 24, which generates the feedback signal $V_s$ on a lead 44 including an ajustable resistor 55. Lead 44 terminates at a minuend input of subtractor 50 receiving the voltage $c_1 V_s$, the parameter $c_1$ being determined by the setting of resistor 55. A subtrahend input of stage 50 is tied to a lead 46 which branches off the output lead 7 of tachometer 28 and includes a voltage limiter 60 as well as an adjustable resistor 56 determining the value of voltage $c_2 V_r$ delivered to that input. The difference $c_1 V_s - c_2 V_r$ of the two signals, after amplification in governor 48, constitutes the corrective signal $\Delta V$ fed to one input of adder 41 receiving on another input, via a branch conductor 45 of lead 7 including an adjustable resistor 59, the signal $c_3 V_r$ derived from the output voltage $V_r$ of tachometer 28.

Since the input signals of governors 15 and 42 may be of either polarity, their amplifiers should be of push-pull type to produce either positive or negative output signals.

As illustrated in FIG. 2, converter 14 comprises an array of six thyristors 114a–114f connected in pairs across conductors 40', 40" of line 40. Each thyristor pair has a junction tied to a respective phase conductor of multiple 36. Pulse generator 18 times the periods of conductivity of these thyristors in such a way that each carries current for a maximum of 120° of a cycle, in overlapping relationship with the two thyristors not in phase therewith tied to the opposite line conductor. Thus, for example, the thyristors may fire in the order 114a–114e—114c-114d—114b–114f, at instants determined by the application of suitable biasing potentials to their gates, with choke 24 maintaining the current flow on line 40 in the intervening gaps. This current flow reaches its maximum when each thyristor conducts for a full 120°.

Converter 19 comprises a similar array of thyristors 119a–119f in series with respective diodes 219a–219f. The thyristors are again connected in pairs across conductors 40' and 40", together with their diodes whose junctions are tied to the three phase leads of outgoing multiple 38. The cathodes of adjoining thyristors 119a–119c and 119d–119f are cyclically interconnected by respective quenching capacitors 319a–319c and 319d–319f whereby the firing of any thyristor by a pulse from distributor 53 deactivates its previously conductive neighbor. Distributor 53, controlled by generator 52 of FIG. 1, determines both the rate and the sequence of firing, thereby setting up a stator field rotating in a chosen direction at a frequency $f_s$ dependent on the signal $V_o$.

Switching circuit 33 may be used to reverse the sense of rotation of the stator field by changing the firing order of thyristors 119a–119f; an output lead 32 of this switching circuit being connected for this purpose to distributor 53. If the speed sensor 28 has only a unipolar output, such a switchover from first-quadrant to third-quadrant operation will not alter the working of the system as described above.

If the load 8 is replaced by an engine driving the shaft 9 so that the rotor cage overtakes the rotating stator field, machine 10 operates as a generator rather than as a motor and the stator voltage on multiple 38 reverses its phase while the polarity of the current flow on line 40 remains unchanged. If the rectifier 43 is a simple diode matrix having the structure of the static thyristor array 14, the polarity of its output signal $V_s$ will also remain the same. In order to maintain the negative slip under these circumstances, the mode of operation of adder 41 may be inverted in this case by a signal on an output lead 30 of switching circuit 33 so that the tachometric signal $V_r$ is negatively rather than positively incremented by the corrective signal $\Delta V$, i.e., that this stage also acts as a subtractor. A similar result could be obtained by inserting an inverter between governor 42 and adder 41 when the system is to operate in the generating mode.

Upon the initial energization of motor 10 to accelerate the load 8 from standstill to the selected speed n, a high slip frequency comes into play and the signal voltage $V_s$ is low. According to the principles of my invention set forth above, such a situation could generate a corrective signal $\Delta V$ tending to lower the stator frequency $f_s$ to a value insufficient to provide the necessary excitation current. To obviate this inconvenience, a starting circuit 54 is briefly actuatable to feed to subtractor 50 an overriding signal $V_x$ simulating the existence of a lower slip frequency giving rise to a signal $\Delta V$ which establishes the optimum frequency difference $f_s-f_r$ regardless of the actual input voltage. Signal $V_x$ is discontinued, manually or automatically, when the rotor has reached a certain minimum speed.

Voltage limiter 60 is a clamping circuit which does not permit the signal $c_2V_r$ to rise above a certain level, corresponding to the upper limit of the dynamic speed range as explained above, regardless of the actual setting of speed selector 20.

FIG. 3 shows the equivalent circuit of motor 10. The input current $I_s$ traverses the stator resistance $R_1$ and the stator inductance $L_1$; it then splits into the excitation current $I_\mu$, passing through the magnetizing inductance $L_o$, and the reflected rotor current $I_r$ traversing the rotor inductance $L_2$ and the apparent rotor resistance $R_r$ consisting of a fixed component $R_2$ and a frequency-dependent component $$R'_2 = R_2(\frac{f_s}{\Delta f} - 1)$$

so that $R_r = R_2 f_s / \Delta f$. Thus, the rotor resistance as seen by the stator current varies inversely with slip frequency.

In FIG. 4 the variations of torque M with slip frequency $\Delta f$ have been plotted for different input currents $I_s$, namely a rated current $I_o$, a lower current $I'$ and a higher current $I''$. In this particular example, the slip frequency is shown to have a value of 2 Hz for the rated torque $M_o$ which is at the peak of curve $I_o$, coinciding with the pull-out point for this rated current. Curve $I'$ has a maximum torque $M'$ of about 0.5 $M_o$ at an optimum slip frequency of slightly more than 1 Hz whereas curve $I''$ shows a maximum torque $M'' \approx 2M_o$ at a slip frequency close to 3 Hz. The origin O represents the synchronous point in which there is no slip.

The left-hand part of each curve, between origin O and its peak, represents the region of stable operation in which any loss in rotor speed, i.e., an increase in slip frequency, augments the torque. On the other hand, if the operating point lies at, say, $M_o$ and the load increases so as to slow down the rotor, the resulting increase in slip frequency $\Delta f$ to 2.5 Hz, for example, would lead to instability unless the input current were simultaneously increased to a value such as that of $I''$ for which this slip frequency is not greater than the optimum corresponding to the peak of the curve. The presence of choke 24 and other reactances in the circuitry of FIG. 1, however, prevents any instantaneous current change of such magnitude.

The rise in slip frequency reduces the apparent rotor resistance $R_r$ (FIG. 3) and with it the signal $c_1V_s$ in the input of stage 50 so that a negative corrective signal $\Delta V$ appears in the output of amplifier 47 and is algebraically added to signal $c_3V_r$ in stage 41. The diminished control signal $V_o$ on lead 51 immediately reduces the stator frequency $f_s$ so that the slip frequency diminishes and the operating point returns to the stable side of curve $I_o$, with temporarily reduction in torque M until the slow feedback by way of control unit 11 raises the stator current to a level close to $I''$ for which the maximum torque is sufficient to restore the sagging rotor speed to its rated value. The rising stator current increases the signal voltage $V_s$ and with it the control signal $V_o$ as well as the stator frequency, allowing the slip frequency to increase to its optimum value for the new stator current which is above the previous value of 2 Hz. With the apparent rotor resistance $R_r$ reduced as a result thereof, voltage $V_s$ substantially regains its earlier value. All these events occur in a small fraction of a second.

The opposite procedure takes place if a sudden load reduction tends to increase the rotor speed with resulting shifting of the operating point to the left on curve $I_o$. Now the voltage $V_s$ rises, the corrective signal $\Delta V$ is positive and adder 41 emits a control signal $V_o$ raising the stator frequency along with the slip frequency. This rise should not shift the operating point on curve $I_o$ farther to the right than peak $M_o$, yet a shift beyond that point will not be harmful since the diminishing torque has no destabilizing effect under these conditions. When the control unit 11 reduces the current to a level close to $I'$, the momentarily accelerated rotor returns to its rated speed and the new operating point is fixed at or near $M'$.

In the system described by way of example, maximum torque at any speed within the dynamic range is established if the ratio of input voltage at the stator terminals to the rotor frequency $f_r$ has a substantially constant value of 4.4 volts/Hz.

Naturally, my invention is not limited to the use of three-phase current in the input of a motor but is applicable to any polyphase power supply.

I claim:

1. A method of operating an induction motor having a stator with multiple phase windings and a rotor coupled with a load, comprising the steps of:
   energizing said phase windings with a polyphase input current of variable frequency to generate a rotating stator field entraining said rotor with a slip frequency depending on the load and on the magnitude of said input current;

maintaining the rotor speed substantially at a selected level by making compensatory adjustments in said magnitude upon deviations of said speed from said level, said compensatory adjustments taking effect with an inherent time lag;

continuously monitoring a stator voltage developed across said phase windings; and automatically varying the frequency of said input current, in response to changes of said stator voltage due to variations in said slip frequency, in a sense temporarily counteracting such variations within said time lag and at a rate substantially faster than the compensatory adjustment of said magnitude in response to a speed deviation.

2. A method as defined in claim 1, comprising the further step of facilitating the start of a load-driving operation by briefly simulating an optimum stator voltage.

3. A system for operating an inductor motor having a stator with multiple phase windings and a rotor coupled with a load, comprising:

a source of polyphase input current of adjustable magnitude and frequency connected across said phase windings for energizing said stator with generation of a rotary magnetic field whereby said rotor is entrained with a slip frequency depending on the load and on said magnitude;

tachometric means coupled with said rotor for generating a first signal proportional to rotor speed;

rectifier means connected across said phase windings for generating a second signal proportional to stator voltage, said stator voltage having a component varying inversely with said slip frequency;

first feedback means of relatively large time constant connected between said tachometric means and said source for maintaining the rotor speed substantially at a predetermined level by making compensatory adjustments in said magnitude in response to variations in said first signal, said compensatory adjustments taking effect with an inherent time lag due to said large time constant;

an arithmetic unit with input connections to said tachometric means and to said rectifier means for synthesizing therefrom a control signal; and second feedback means of relatively small time constant connected between said arithmetic unit and said source for varying the frequency of said input current, in response to changes in said control signal indicative of a variation in said slip frequency causing a departure of said stator voltage from substantial proportionality with said rotor speed, in a sense counteracting said departure by temporarily reversing said variation in slip frequency prior to effective intervention of said first feedback means in response to variations in said first signal alone.

4. A system as defined in claim 3 wherein said source comprises a polyphase power line, first conversion means connected to said power line for deriving a rectified current therefrom, and second conversion means in cascade with said first conversion means for deriving said input current from said rectified current, said first feedback means including a conduction timer connected to said first conversion means for controlling the magnitude of said rectified current, said second feedback means including a switching-pulse generator connected to said second conversion means for controlling the frequency of said input current.

5. A system as defined in claim 4 wherein said source further comprises reactance means inserted between said first and second conversion means for smoothing said rectified current.

6. A system as defined in claim 5 wherein said reactance means is a choke.

7. A system as defined in claim 3 wherein said arithmetic unit comprises a subtractor stage with inputs respectively connected to said tachometric means and to said rectifier means for deriving a corrective third signal from the difference of said second and first signals, an adder stage with inputs respectively connected to said subtractor stage and to said tachometric means for deriving said control signal from the sum of said second and third signals, and high-gain amplifier means inserted between said subtractor and adder stages.

8. A system as defined in claim 7 wherein said amplifier means comprises an operational amplifier with an at least partly ohmic feedback path.

9. A system as defined in claim 7, further comprising voltage-limiting means inserted between said tachometric means and said subtractor stage for preventing a rise of said first signal beyond a predetermined maximum upon selection of a speed level above a range of dynamic adjustability of the induction motor.

10. A system as defined in claim 7, further comprising start means connected to another input of said subtractor stage for applying thereto an overriding signal simulating an optimum slip between said magnetic field and said rotor in an initial operating phase.

11. A system as defined in claim 7, further comprising switchover means for inverting the polarity of said third signal upon operation of said motor as a generator.

12. A system as defined in claim 3, further comprising speed-selector means generating a reference signal, said first feedback means including a comparator with inputs connected to said tachometric means and to said speed-selector means for deriving an error signal from any difference between said first signal and said reference signal.

13. A system as defined in claim 3 wherein said rotor is of the squirrel-cage type.

* * * * *